United States Patent
Bade et al.

(10) Patent No.: US 7,900,059 B2
(45) Date of Patent: Mar. 1, 2011

(54) SEALING OF DATA FOR APPLICATIONS

(75) Inventors: Steven A. Bade, Georgetown, TX (US); Andrew Gregory Kegel, Redmond, WA (US); Leendert Peter Van Doorn, Valhalla, NY (US)

(73) Assignee: International Business Machines Corporation, Armonk, NY (US)

( * ) Notice: Subject to any disclaimer, the term of this patent is extended or adjusted under 35 U.S.C. 154(b) by 1144 days.

(21) Appl. No.: 11/301,803

(22) Filed: Dec. 13, 2005

(65) Prior Publication Data

US 2007/0136577 A1 Jun. 14, 2007

(51) Int. Cl.
G06F 11/30 (2006.01)
G06F 12/14 (2006.01)

(52) U.S. Cl. ..................... 713/193; 713/190
(58) Field of Classification Search ............. 713/193
See application file for complete search history.

(56) References Cited

U.S. PATENT DOCUMENTS

| | | | |
|---|---|---|---|
| 7,028,149 B2 * | 4/2006 | Grawrock et al. | 711/156 |
| 7,421,588 B2 * | 9/2008 | Challener et al. | 713/193 |
| 7,480,806 B2 * | 1/2009 | Grawrock | 713/189 |
| 7,516,321 B2 * | 4/2009 | Chen et al. | 713/155 |
| 2003/0074548 A1 * | 4/2003 | Cromer et al. | 713/1 |
| 2003/0163711 A1 * | 8/2003 | Grawrock | 713/189 |
| 2004/0151319 A1 * | 8/2004 | Proudler | 380/277 |
| 2005/0058294 A1 * | 3/2005 | Chen et al. | 380/277 |
| 2005/0229008 A1 * | 10/2005 | Crane | 713/186 |
| 2006/0075223 A1 * | 4/2006 | Bade et al. | 713/162 |
| 2006/0161784 A1 * | 7/2006 | Hunter et al. | 713/182 |
| 2006/0212939 A1 * | 9/2006 | England et al. | 726/22 |
| 2007/0226505 A1 * | 9/2007 | Brickell | 713/176 |

OTHER PUBLICATIONS

TCG Specification Architecture Overview, Specification Revision 1.2, Apr. 28, 2004.

* cited by examiner

*Primary Examiner*—Christian LaForgia
(74) *Attorney, Agent, or Firm*—Dillon & Yudell LLP (57) ABSTRACT

A method, system and computer program product for implementing general purpose PCRs with extended semantics (referred to herein as "ePCRs") in a trusted, measured software module. The module is designed to run in one of a hypervisor context, an isolated partition, or under other isolated configurations. Because the software module is provided using trusted (measured) code, the software implementing the PCRs is able to run as a simple software process in the operating system (OS), as long as the software is first measured and logged. The software-implemented ePCRs are generated as needed to record specific measurements of the software and hardware elements on which an application depends, and the ePCRs are able to ignore other non-dependencies.

7 Claims, 5 Drawing Sheets

SEALING OF DATA FOR APPLICATIONS

BACKGROUND OF THE INVENTION

1. Technical Field

The present invention relates generally to data processing systems and in particular to security of data processing systems. Still more particularly, the present invention relates to a method, system and computer program product for providing improved security of applications running on a secure data processing system.

2. Description of the Related Art

The Trusted Computing Group (TCG) specifications define a set of Platform Configuration Registers (PCRs) that are typically implemented in a hardware element called a Trusted Platform Module (TPM). In conjunction with log-files, the PCRs contain information that describes precisely the hardware and software configuration of a system. The characteristics of every unique program run by the system are recorded in the appropriate log-file, and the recorded data "extends" the corresponding PCR.

There are several important characteristics of conventional PCRs. First, the PCR may only be changed by an "extend" operation. The extend operation uses a secure hash of the prior value and the new "extend" value to create the new PCR content. Second, the PCR is order sensitive, e.g., "(extend(a, extend(b,0)) !=extend(b, extend(a,0))," and the PCR remembers historical information. Third, any program/application that runs on the system is measured and extended into a PCR before the program/application is run in the trust chain that was previously measured before the application is run. Conventionally, the trust chain starts with special code, called the RTM (or Root of Trust for Measurement) that is tied to the System Reset signal. Finally, the PCRs use cryptographic hashing techniques to ensure the PCRs are safe and trustworthy.

Figure 4:
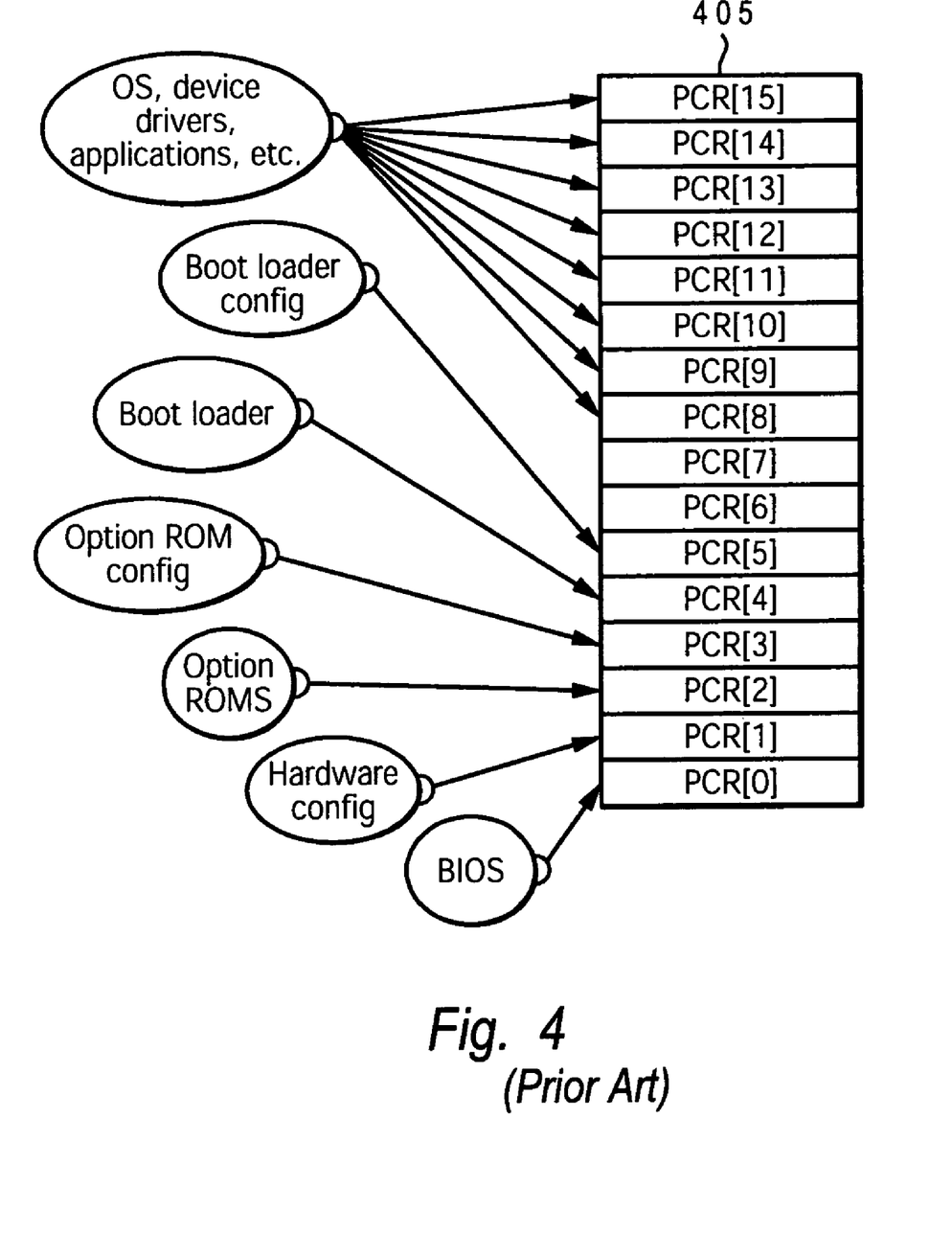
FIG. 4 is a diagram of conventional allocation of PCRs to system software components according to the prior art.

FIG. 4 illustrates conventional usage of PCRs according to current TCG specifications. As shown, 16 PCRs (PCR0-PCR15) 405 are provided within the TPM, each assigned to specific software/firmware functions of the computer system. PCR0 through PCR5, inclusive, have specific definitions for their respective contents. As shown, for example, PCR0 is allocated to BIOS, PCR1 to hardware configuration, and PCR5 to boot loader configuration.

Other PCRs are allocated to similar purposes although their precise contents are not always specified. Specifically, PCR8-PCR15, inclusive, are allocated to unspecified uses in the Operating System (OS). Using LINUX as an example of a modem operating system, there are many components (typically around 500) that must be recorded into the eight PCRs assigned to the OS (i.e., PCR8-15). Example components includes kernel, kernel extensions, device drivers, kernel configuration information, device driver configuration information, shared libraries, system services (daemons), executables (binary), and executables such as Java byte streams, shell scripts, and Perl programs, for example.

A special operation called "sealing" protects cryptographic key materials (or any other data) by tying the information to the specific contents of a specific set of PCR values. "Sealing" refers to performing an encryption with system configuration information in addition to the usual cryptographic key. When information is "sealed to a set of PCRs", the information is not merely encrypted but is further protected against any system configuration change. If the system configuration changes (as represented by a change in the PCR values), the data cannot be unsealed (decrypted). For example, a changed configuration could be a sign of an attempt to hijack the system, such as a "root kit attack" or a virus, and the PCR and log-file changes induced by the change will prevent data from being unsealed and exposed to the attacking agent. Sealing also binds the decryption operation to the specific machine. If a user copies the sealed data to another machine, the data will not be unsealed even if the hardware and software configurations are identical.

In current TCG architecture, selecting the appropriate set of PCRs to "seal to" is very difficult because the PCRs may be changed as the system operates. As significant system events occur, the events are inserted into a PCR (i.e., they "extend the PCR") thereby changing the PCR's value. For example, running/executing a new program is a significant event and will thus be logged into a PCR. Since, as shown by FIG. 4, there are a limited number of PCRs implemented in hardware (typically three groups of eight allocated to BIOS, a "static" operating system, and a "dynamic" operating system), many unrelated events are recorded in the same PCR, each one changing the previous value of the PCR. For example, all PCI hot-plug and USB hot-plug events will probably be logged to the same few PCRS.

Using the available PCRs, any program that needs to seal data to a PCR must sort through the maze of options to select the proper PCRs for sealing, and this process is sensitive to changes in any or all of the programs (as reflected in the PCR values). In practice, sealing to BIOS PCRs (e.g., PCR0 through PCR5, inclusive) is more practical but this process provides no insight as to characteristics of the OS, which is where a virus is most likely to attack.

Outside the ability to seal to the hardware and BIOS configuration (which is relatively stable), it is extraordinarily difficult to seal to relatively stable PCRs that describe the operating system, software services (Linux daemons, for example), or applications. With some conventional implementations, data can be "resealed" to new configuration values under the proper protocols and conditions, thus handling planned or scheduled system or application changes.

One problem with conventional utilization of PCRs is that the application/system has to choose a particular PCR or set of PCRs and the implied PCR values to which to seal data for later use. This becomes difficult because of the changing nature of PCR values. For example, if programs are run in a different order (e.g., due to external events), the PCR values will be different (due to a further extend of the PCR). If a new program or subroutine is executed, the PCR values will be different than if the new program had not run, even though the program may have no effect on the application. Also, because the PCRs reflect all of the (trusted) history, the PCRs will never return to prior values once changed (at least until the PCRs wrap around the approximately 160 bits within the register). Several solutions have been proposed to address the above limitations in conventional PCR implementation.

A first proposed solution is to seal the same data (e.g., cryptographic key material) to different sets of expected PCR values. For example, a first set of PCR values would represent the normal state, a second set of PCR values would represent the state after an approved USB (universal serial bus) insertion, a third set represents the state after some other approved device is inserted, and so on. Obviously this solution is both cumbersome and complex to administer, as a system administrator or programmer has to plan for arbitrary numbers and sequences of insertion and removal events. Also, each configuration has to be created (instantiated) to complete the sealing operation because most manufacturers do not define the measurement process clearly enough to reproduce it independently, nor do the provided utilities do the calculations for the programmer. This makes it impossible to calculate the new PCR values, so empirical approaches must be used. Since new events change the PCR values and all events are retained from the original bootstrap, this process could require an endless list of permutations and combinations and repetitions.

A second, simpler solution is to seal data to one set of PCR values and allow unsealing under exactly that one configuration. However, that solution fails to account for the dynamic nature of modem systems, which may include software patches, for example. The solution also forces a reboot of the system in order to restart an application because the very act of reloading the application may change the PCR values, preventing the unsealing of data needed by the application.

A third proposed solution is to dedicate a PCR to each application, but that solution quickly becomes impractical because the TPM is usually implemented as a monolithic chip that would need large resources (many PCRs) to handle all the possible applications. This solution would also make the TPM costly to manufacture. Finally, a fourth proposed solution is to provide multiple TPM chips (following the V1.2 specification). However, this solution runs into the same limited-hardware problems noted in the third solution. Also, there remains the unsolved problem of properly synchronizing the multiple TPM chips, especially in the case of the dynamic CRTM (Core Root of Trust for Measurement) model.

In summary, the selection of PCRs for sealing information that is sensitive to basic "pre-boot" environment of a computer system (i.e., prior to start of the Operating System) can be done if the designer is very careful. However, the selection of PCRs for sealing information that is sensitive to the Operating System is currently infeasible and/or unsolved.

SUMMARY OF THE INVENTION

Disclosed is a method, system and computer program product for implementing general purpose PCRs with extended semantics (referred to herein as "ePCRs") in a trusted, measured software module. The module is designed to run in one of a hypervisor context, an isolated partition (such as a logical partition, LPAR, or a guest virtual machine, VM), the trusted portion of the Microsoft Windows® NGSCB (next generation secure computing base) architecture, or under other isolated configurations. Because the software module is provided using trusted (measured) code, the software implementing the PCRs is able to run as a simple software process in the operating system (OS), as long as the software is first measured and logged. The software-implemented ePCRs are generated as needed to record specific measurements of the software and hardware elements on which an application depends, and the ePCRs are able to ignore other non-dependencies.

The above as well as additional objectives, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF AN ILLUSTRATIVE EMBODIMENT

The present invention provides a trusted software implementation of platform configuration registers (PCRS) with extended semantics to address/remove the difficulty of specifying hardware PCR values for sealing. The invention thus introduces software PCRs, referred to herein as extended PCRs or ePCRs, which are currently not part of the TCG (Trusted Computing Group) specifications. As utilized herein, trusted software is simply a software component which is measured into a conventional PCR and can thus be examined to see if the version and configuration meet a trust or security policy. To ensure the highest level of trust, the software component is loaded in a manner that guarantees isolation from other software components by a component that is trusted (i.e., the software component is loaded in an isolated partition provided by a hypervisor or in a process in an "A1" secure operating system (OS)).

The invention thus provides a method, system and computer program product for implementing general purpose PCRs with extended semantics (referred to herein as "ePCRs") in a trusted, measured software module. The module is designed to run in one of a hypervisor context, an isolated partition (such as a logical partition, LPAR, or a guest virtual machine, VM), the trusted portion of the Microsoft Windows® NGSCB (next generation secure computing base) architecture, or under other isolated configurations. Because the software module is provided using trusted (measured) code, the software implementing the PCRs is able to run as a simple software process in the operating system (OS), as long as the software is first measured and logged. The software-implemented ePCRs are generated as needed to record specific measurements of the software and hardware elements on which an application depends, and the ePCRs are able to ignore other non-dependencies Referring now to FIG. 1, there is illustrated an exemplary data processing system configured according to TCG specification and within which the various features of the invention may advantageously be implemented. Data processing system 100 includes processor (central processing unit) 105, which is coupled to memory 115, input/output (I/O) controller 120 and network interface device (NID) 130 via system interconnect 110. NID 130 provides interconnectivity to an external network (not shown), through which one or more of the processes and/or applications that are executed by processor 105 may be accessed or loaded on data processing system 100. I/O controller 120 provides connectivity to input devices, of which mouse 122 and keyboard 124 are illustrated, and output devices, of which display 126 is illustrated. Notably, data processing system 100 may also support a USB (universal serial bus) functionality by which other hardware components are able to connect to the data processing system 100 via a USB port (not specifically shown).

In addition to the above components, data processing system includes a trusted platform module (TPM) 150, which is illustrated as a separate hardware device coupled to system interconnect 110. TPM 150 provides the functionality described within the TCG specifications, but is used to also support the use of ePCRs 145 to support an expansion of the limited number of hardware PCRs 155 that may exist within TPM 150. The actual number of hardware PCRs 155 within TPM 150 is not necessarily relevant to the inventive features described herein. However, for simplicity in the description, TPM 150 is assumed to have 16 hardware PCRs 155 as illustrated within FIGS. 2A and 2B, described below. Other hardware components (not specifically illustrated) may be provided within/coupled to computer system 100. The illustration is thus not meant to imply any structural or other functional limitations on computer system 100 and is provided solely for illustration and description herein.

In addition to the above described hardware components of computer system 100, several software and firmware components are also provided within computer system 100 to enable computer system 100 to complete general processing as well as provide software-implementation of ePCR functionality. Among these software/firmware components are operating system (OS) 117, basic input-output system (BIOS) 118, application programs 119 (of which six are provided for illustration), and extended TPM (or ePCR) utility 140. In the illustrative embodiment, ePCR utility 140 is illustrated as a separate software component from OS 117. However, it is understood that in alternate embodiments, ePCR utility 140 may be located on a separate trusted partition of memory, in some other trusted medium, or provided as a sub-component of OS 117 that is trusted and cannot be manipulated by external inputs. When executed by processor 105, ePCR utility 140 executes a series of processes, which provide the various functions described below (referencing FIGS. 2A-2B and 3). In one embodiment, the extend TPM utility 140 may be implemented as part of the TSS (TCG Software Stack) that is defined by the TCG architecture. As defined, TSS is the unprotected area of the TCG architecture, while the TPM is the protected area In one embodiment, to further increase the protection of the software ePCRs (SW ePCRs), the described embodiment exploits the TCG feature of "locality" to load the trusted SW ePCR on-demand and in a trusted manner. By loading the system management component in the "locality" process, the SW ePCRs are placed in a protected area 142 of the system memory or other secure storage so that the SW ePCRs are isolated from attacks implemented in software.

As provided within the described embodiments, the trusted code implements more highly functional PCR semantics than that specified by the TCG and implemented in conventional hardware TPM. The basic function of a PCR (i.e., measurements are utilized to extend the PCR values) as defined by the TCG remain substantially unchanged. Additionally, with the implementation of ePCR functionality within the system, the events that extend an ePCR are defined by the application(s) 119 (FIG. 1), and the same events are able to extend one or more hardware PCRs in conjunction with the ePCR(s). The log entries corresponding to the hardware PCR extend operations are also required as defined by the TCG specification for hardware PCRs, but each software-implemented ePCR has a private log containing only the events that are recorded in the ePCR. The events defined in the ePCR may be specified as filenames to be measured before they are executed (if they are executed), for example.

The enhanced PCR functionality is implemented in a Core Root of Trust for Measurement (CRTM) architecture. Within this architecture, the CRTM may read the bits in the PCR to determine if any of the segments of the flash memory have been updated and obtain the measurement values in the table for those segments that store the power-on self-test (POST) BIOS code that have not been updated. Two types of CRTM architectures are provided, a static CRTM architecture and a dynamic CRTM architecture, each exhibiting somewhat different operating characteristics that affect the processing by the ePCR utility in implementing the features of the invention.

In the static CRTM architecture, a dedicated hardware PCR is allocated to hold the measurement of the trusted software component or, in an alternate embodiment, the measurement is provided as simply one more log entry extended into an existing PCR. In the dynamic CRTM architecture, the same hardware PCR utilized with the static CRTM architecture is utilized, while in an alternate embodiment, the locality architecture is utilized to allow the PCR corresponding to the trusted software component to be re-settable under control of suitable operating system components.

Figure 1:
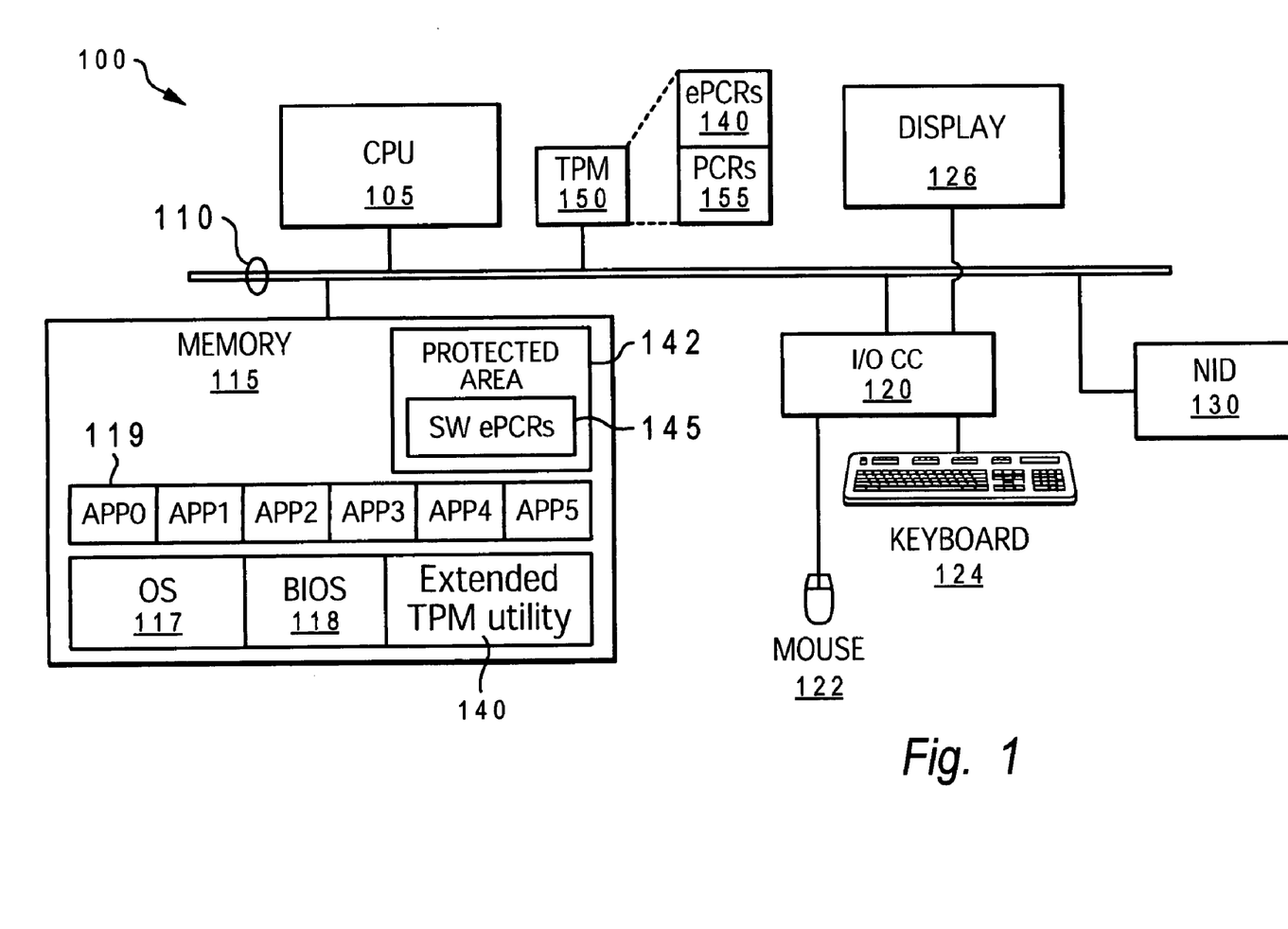
FIG. 1 is a block diagram of a data processing system within which various features of the invention are implemented in one embodiment of the invention.
Figure 2A:
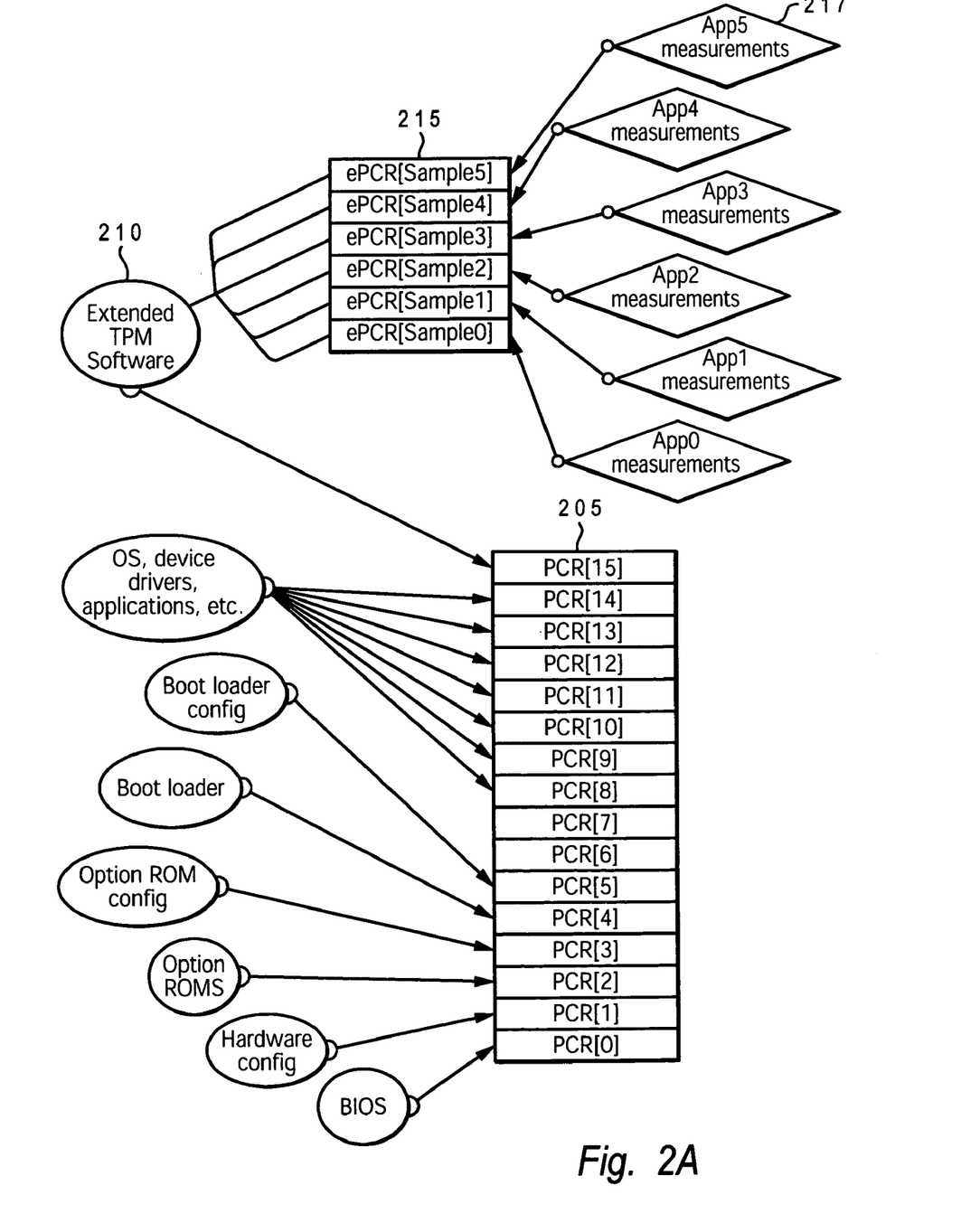
FIGS. 2A-2B are diagrams illustrating extended PCR configurations supporting ePCRs according to two embodiment of the invention.

FIG. 2A illustrates one implementation of the extended PCRs according to one embodiment. In FIG. 2A, one of the hardware PCRs 205 (namely, PCR15 in the example) is allocated to a special trusted process referred to herein as extended TPM software (or utility) 210. For simplicity of the description, PCR15 is described as dedicated to this single trusted process. However, the specific association of PCR15 to this single trusted process is not a requirement for other embodiments of the invention. As shown in FIG. 2A, extended TPM utility 210 generates ePCRs 215, of which six are illustrated, each associated with a specific one of applications 119 (FIG. 1). Each ePCR 215 is thus shown with a particular measurement 217 corresponding to the application whose process generated the ePCR 215. The ePCRs 215 are provided unique (and perhaps arbitrary) names, and in one embodiment, each application is allowed to choose any (not-yet-utilized) name to apply to the associated ePCR(s). The selection of an arbitrary name is thus subject to conventional collision rules (e.g., an ePCR cannot be given a name already in use, and thus, each name has to be unique).

Unlike conventional PCR implementation (i.e., TPM hardware-enabled PCRs using TCG specification), which typically measure and extend every process into one mass, the implementation of the ePCRs of the illustrative embodiments measures and seals only what is defined by the application as a dependency (of that application). Notably, even with the ePCR functionality, the conventional extend of measurements to the hardware PCRs continues to be performed. That is, the measurements held in an ePCR are also recorded in any of the hardware PCRs that the measurements would normally be extended to.

Figure 2B:
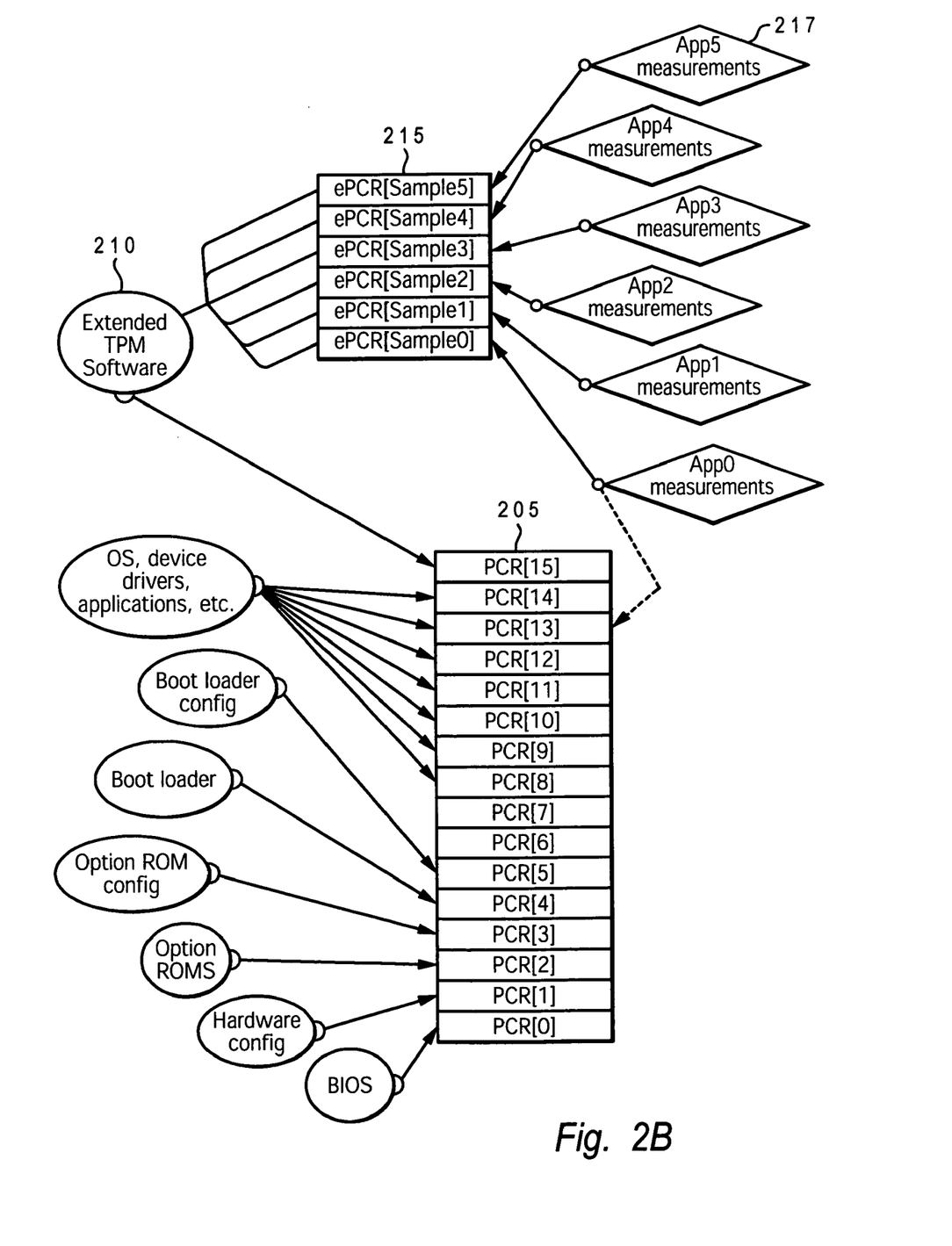

FIG. 2B provides an illustration of this dual extend feature (i.e., to both the ePCR and the conventional hardware PCRs), where the "extend" of measurements into the hardware PCRs follow conventional TCG specifications. As illustrated, measurements within ePCR representing measurements of applications ("App0 measurements") are also extended to hardware PCR13. Likewise, other measurements in other ePCRs may similarly be extended into other hardware PCRs. Thus, the selection and description of PCR13 herein is provided for illustration only. Different PCRs, other than PCR13, may be utilized in other embodiments of the invention.

With the above configuration, the trusted ePCR process (of the extend TPM utility) is measured (similar to all other processes occurring on the system), and the measurement is recorded/stored/extended into PCR15. The selection of PCR15 is for illustration only, and different PCRs may be utilized in other embodiments of the invention. The trusted ePCR process collects measurements of other system and application processes, illustrated as App0 through App5 measurements. In the illustrative embodiments, the measurements are referred to as "application measurements" because the measurements correspond to those measurements specified or required by the various applications. However, the measurements are not limited to measurements of the application programs themselves, and the necessary measurements are defined at the time the corresponding application is installed. Accordingly, in one embodiment, the application's installation package includes (1) a list of the components to which the software application is sensitive, and (2) the corresponding requirements on the measurements (e.g., the sequence of measurements). The list is appropriately protected (e.g., signed by the software vendor) to maintain the implied trust.

Figure 3:
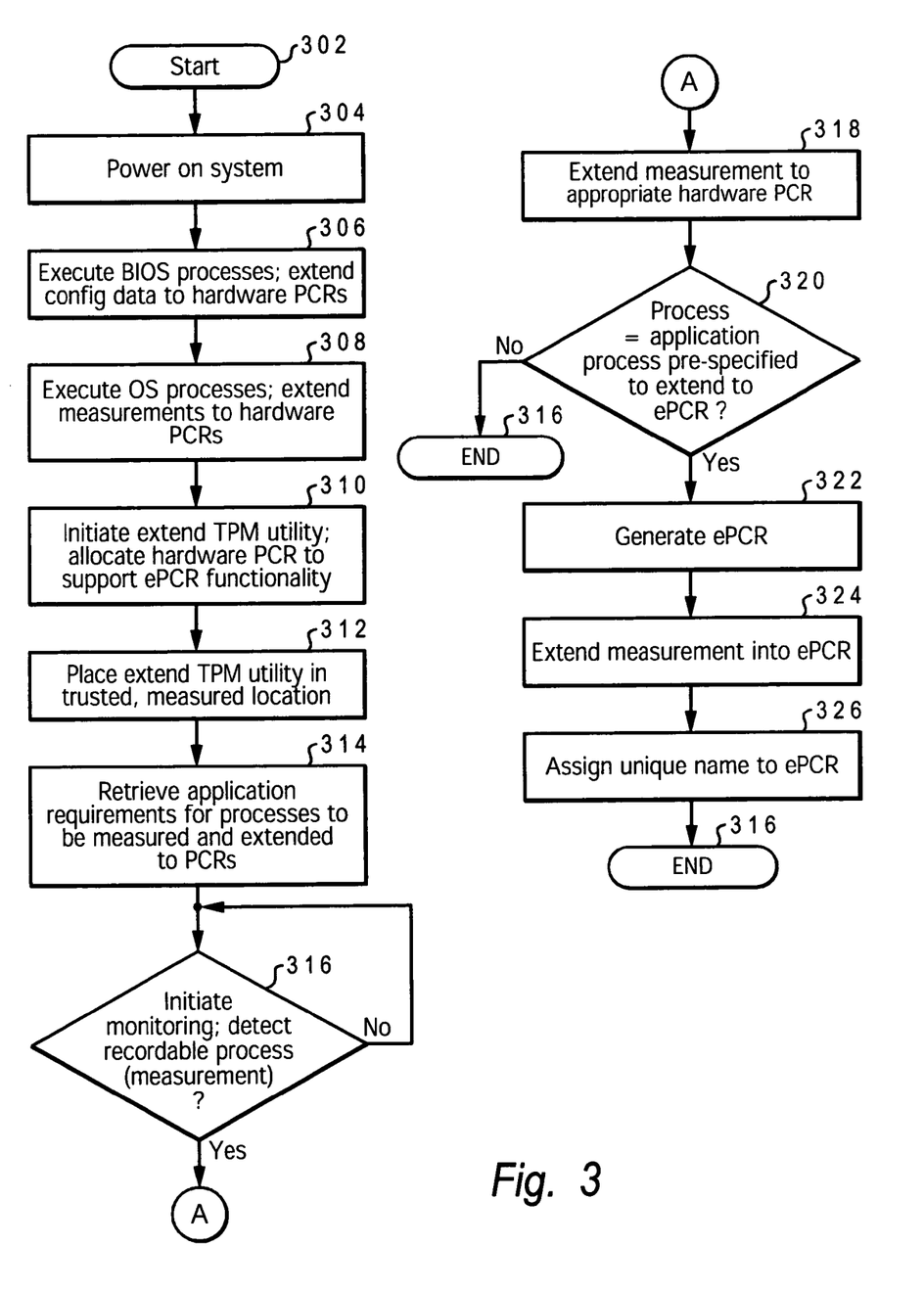
FIG. 3 is a flow chart of the process of generating and utilizing the extended PCRs (ePCRs) of FIGS. 2A-2B, according to one embodiment of the invention.

FIG. 3 is a flow chart generally illustrating the processes involved in setting up the trusted ePCR utility (extend TPM utility) and implementation of ePCR functionality, according to one embodiment of the invention. The process begins at block 302 and continues to block 304 at which the system is powered on. Once the system is powered on, POST BIOS processes and other system configuration processes are executed, and the configuration data extended to the respective hardware PCRs as shown at block 306. OS processes are also executed and extended into their corresponding PCRs at block 308. Concurrently, extend TPM utility is executed at block 310 and extend TPM utility allocates one (or more of the hardware PCRS) to support ePCR functionality. Extend TPM utility is placed in a trusted (measured) location within the system at block 312.

Following the system configuration and OS startup procedures, the extend TPM utility retrieves the specific application requirements (from a table generated during installation of the application(s)) that are to be measured, as shown at block 314. As described above, each application provides a list of processes/activity that should be monitored by the enhanced security mechanism of the extend TPM utility. This list may be provided during initial installation of the application and is stored in a trusted location on the system. The extend TPM utility thus knows which activity related to the specific application are relevant to its ePCR functions. In one embodiment, a desired nomenclature for the ePCRs is provided by the application and utilized by the ePCR when completing an extend operation to an ePCR.

Returning to the flow chart, system processes are monitored by the OS, and a determination made at decision block 316 when a process generates a measurement that should be recorded within the PCRs. If such a measurement is detected (or the process occurs within the system), the normal extend to a hardware PCR is performed, as indicated at block 318. A determination is made at block 320 (by executing ePCR utility) whether the process that generated the measurement was one of the pre-identified application processes that also triggers an "extend to ePCR" operation.

According to the definition of a TCG PCR, a given command that is able to execute needs only be measured and recorded at the first instance of execution. Further execution instances need not be measured if the executable is unchanged from the initial execution. If the actual command file has changed, the command must be measured as a new instance of the application process. In one embodiment, the extended ePCR may be defined in such a way as to measure each and every execution instance, or in another embodiment, the extended ePCR may echo the behavior of the hardware PCRs. The specific method of operation may be left to the selection of each application or system designer. In another example, where an application does not utilize a particular code library or application, the activation of the particular code library or application would not be a significant, measurable event for the given application.

Returning to FIG. 3, if the process is a valid application process that triggers such an extend operation, an ePCR is generated by ePCR utility and assigned to that application process at block 322. The ePCR utility then extends the measurement into the allocated ePCR at block 324. Following, the ePCR utility assigns a unique name to the ePCR at block 326, perhaps based on the name assignments provided by the application that generated the measurement.

The above described embodiments provide for the utilization of software-implemented (SW) ePCRs that comprise several different characteristics than the hardware PCR implementation. Among these characteristics of the ePCRs are the following: (1) SW ePCRs are arbitrary in number, while traditional hardware implementations are strictly limited to what PCR allocation is present on the chip at the time of design; (2) SW ePCRs may be named arbitrarily, while standard PCRs are referenced only by number; (3) The module implementing the SW ePCRs may be updated without requiring hardware changes through a controlled software distribution model, and, in one embodiment, the updates are expected to follow a procedure similar to that required to update the CRTM; (4) The precise semantics of each SW ePCR may be tailored to the exact policy needs of each application developer; (5) The problem of combing irrelevant information in large, long log files is reduced (or substantially eliminated) because each SW ePCR contains only the information relevant to the corresponding application; and (6) Because the SW ePCR is so tailored to the expectations and requirement of the corresponding application, data may be sealed to the ePCR very simply and the ePCR may be made independent of (or immune to) many system changes that change other (traditional) hardware PCR values. Characteristic 2 above enables the concurrent handling of many versions of the same package without conflict (e.g., PCRs could be named "Package_A_Build_1000" or "Package_A_Build_1001").

As a final matter, it is important that while an illustrative embodiment of the present invention has been, and will continue to be, described in the context of a fully functional computer system with installed management software, those skilled in the art will appreciate that the software aspects of an illustrative embodiment of the present invention are capable of being distributed as a program product in a variety of forms, and that an illustrative embodiment of the present invention applies equally regardless of the particular type of signal bearing media used to actually carry out the distribution. Examples of signal bearing media include recordable type media such as floppy disks, hard disk drives, CD ROMs, and transmission type media such as digital and analogue communication links.

While the invention has been particularly shown and described with reference to a preferred embodiment, it will be understood by those skilled in the art that various changes in form and detail may be made therein without departing from the spirit and scope of the invention.

What is claimed is:

1. In a data processing system having a trusted platform module (TPM) with a plurality of hardware Platform Configuration Registers (PCRs), a method comprising:
    dynamically determining when a current process of the data processing system is a pre-defined process associated with an application running on the data processing system, which process has been pre-defined by the application as a process that should be monitored by an enhanced security mechanism of an extend TPM (ePCR) utility, wherein the dynamically determining includes autonomously monitoring applications running on the data processing system, and wherein the dynamically determining is performed by the extend TPM utility, which is a separate component from the applications;

in response to determining that the current process is one of one or more pre-defined processes:

the TPM automatically generating a Platform Configuration Register with extended semantics (ePCR) within a trusted, secure location of the data processing system, wherein said ePCR records only specific pre-defined measurements of software and hardware elements of an application, wherein the automatically generating is performed by the extend TPM utility, separate from the application, and wherein the ePCR functions independent of the hardware PCR;

the TPM directly extending a measurement of the current process into the ePCR, wherein only measurements of processes associated with the pre-defined processes are extended into respective ePCRs, wherein the directly extending is performed by the extend TPM utility, separate from the application; and wherein other measurements not relevant to the one of one or more applications are ignored by the extend TPM utility.

2. The method of claim 1, further comprising, assigning a unique name to the ePCR allocated to the current process, wherein said unique name may be a specific name provided by the application for assigning an ePCR.

3. The method of claim 1, further comprising:

detecting an installation of a new application on the data processing system;

retrieving information associated with the new application that identifies which processes are pre-defined processes that trigger generation of ePCRs for that application;

storing said information within a trusted location of the data processing system;

accessing said information when a process is detected;

determining if the detected process is one of the predefined processes that trigger generation of an ePCR; and enabling said generation of the ePCR only when the detected process is one of the predefined processes.

4. The method of claim 3, further comprising:

generating a list of events of relevance during installation of the new application, said list including hardware and software events that produce measurements that are to be extended to an ePCR; and providing each generated ePCR with a private log of the list of events of relevance.

5. The method of claim 1, further comprising:

wherein said hardware PCRs are located within a Trusted Platform Module (TPM) utility and said software-enabled ePCRs are located within a trusted, measured software module that complies with a trust policy of the trusted computing group (TCG), said trusted, measured software module being one or more of:

a hypervisor context; an isolated partition, a trusted portion of operating system (OS) architecture, an isolated configuration, and a part of the TCG software stack (TSS); and enabling a locality feature of TCG to load a trusted ePCR on-demand in a trusted manner, wherein the ePCR is placed in a protected area of one of the system memory and other secure storage such that the ePCR is isolated from attacks implemented in software.

6. The method of claim 1, further comprising:

autonomously tracking all processes occurring on the data processing system;

in response to detecting a measurable process, automatically extending the measurement into one or more of the hardware PCRs pre-assigned to be extended by the detected measurable processes; and in response to determining if that the measurable process is also a pre-defined process that should be extended to an ePCR, dynamically extending the measurement of the process to a separate, newly generated ePCR, wherein pre-defined processes are measured and extended to both a hardware PCR and an ePCR, and every measurement extended to an ePCR is also extended to a particular hardware PCR allocated to that process type.

7. The method of claim 1, further comprising generating specialized instructions for the ePCR, wherein the specialized instructions are specifically tailored to meet the policy needs of the one of one or more applications.

* * * * *